Figure 1:
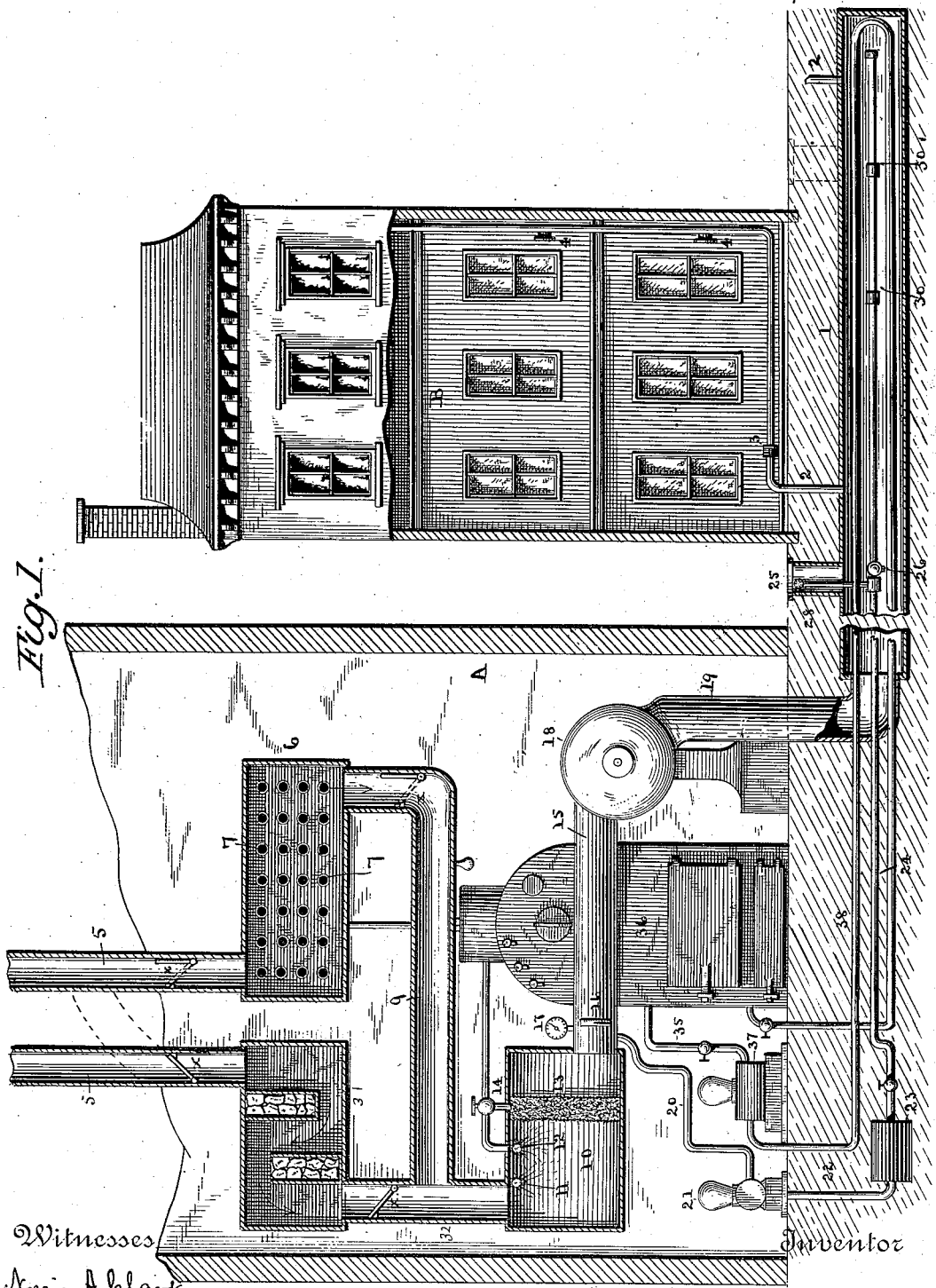

(No Model.) 2 Sheets—Sheet 1.

T. R. TIMBY.
APPARATUS FOR HEATING, COOLING, AND VENTILATING.

No. 465,298. Patented Dec. 15, 1891.

Witnesses
Norris A. Clark.
L. M. Bartlett

Inventor
T. R. Timby
By W. H. Bartlett
Attorney

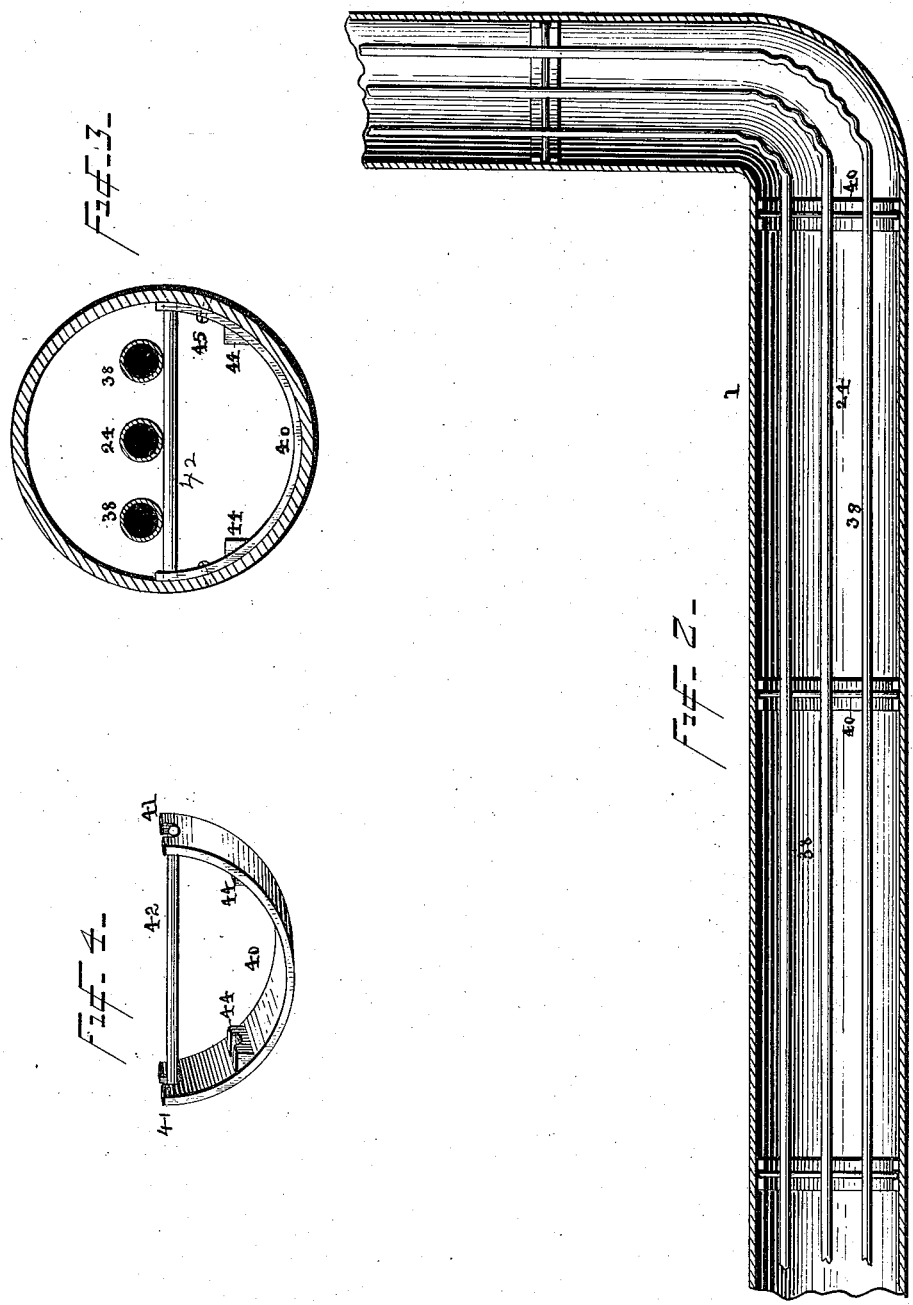

UNITED STATES PATENT OFFICE.

THEODORE R. TIMBY, OF WASHINGTON, DISTRICT OF COLUMBIA, ASSIGNOR, BY DIRECT AND MESNE ASSIGNMENTS, TO THE NATIONAL HEATING AND VENTILATING COMPANY, OF SAME PLACE.

APPARATUS FOR HEATING, COOLING, AND VENTILATING.

SPECIFICATION forming part of Letters Patent No. 465,298, dated December 15, 1891.

Application filed February 21, 1889. Renewed July 21, 1891. Serial No. 400,206. (No model.)

*To all whom it may concern:*

Be it known that I, THEODORE R. TIMBY, residing at Washington, in the District of Columbia, have invented certain new and useful Improvements in Apparatus for Heating, Cooling, and Ventilating, of which the following is a specification, reference being had therein to the accompanying drawings.

This invention relates to mechanism for heating, cooling, and ventilating houses in cities.

The invention consists in the structures and combinations of the parts constituting the device.

The object of the invention is to improve the apparatus, whereby a supply of pure air, heated or cooled to the required temperature and of desirable hygrometrical condition, may be delivered to any house along the line of a main.

Figure 1 is a diagrammatic view, partly in section and partly in elevation, of the principal elements constituting my device. Fig. 2 is a longitudinal section, and Fig. 3 a cross-section, of pipe 1 enlarged. Fig. 4 is a perspective of pipe-supporting saddle.

A indicates the power-house or distributing-station, and B a house along the line of the main.

An air-main 1 leads along the line of the street as far as may be necessary or advisable. This main has branch air-pipes 2 wherever necessary, which pipes lead into the houses. Each pipe 2 generally leads to a meter or air-registering device 3, and so to registers 4 4, as many as may be needed. The air is drawn into the station through a tall stack. As many stacks 5 may be provided as needed, or a single one may lead either to the heater or cooler by suitable branch pipes.

An air-heater is indicated at 6, where the air passes through a chamber and in contact with steam-pipes 7 or any other device for heating. Then by passage 9 the air passes to a chamber 10, where there is a water-sprayer 11 and a steam-jet 12, from either of which moisture may be communicated to the air. The air then passes through a layer or strainer of sponge, fiber, or similar material, indicated at 13, which strainer may be moistened from pipe 14. From chamber 10 the air goes to pipe or passage 15, where a thermometer, hygrometer, or other instruments may be provided, as at 16 and 17, to show the condition of the air. From passage 15 the greater part of the air is propelled by a fan or other forcer 18, through passage 19, into the air-main 1, and thence passes from the main to the houses. A branch pipe 20 leads from some part of the air-supply pipe to an air-compressor or other forcer 21 and by pipe 22 to a storage-reservoir 23, should a reservoir be desirable. From thence by an air-pipe 24 this air is conducted into the main 1, and moves along the main at a higher pressure than that normally in the main.

At suitable intervals along the main manholes 25 are provided, from which the cocks 26 may be operated to permit air to escape from the inner pipe 24 to the main, and temperature and pressure gages (indicated at 28) may be provided, by which the condition of the air in the pipes may be inspected at the manholes, the holes being sealed when not in use.

Automatic valves 30, which will open on a reduction of pressure in the main 1, may be provided along the line of pipe 24, the construction of such valves being well known in the art.

In hot weather the air may be drawn from stack 5 through the refrigerator 31, and so by passage 32 to the scrubbing box or chamber 10, where it may be moistened by a cool spray before passing through the strainer 13, and so to the air passages and main.

All the air-passages will be controlled by suitable doors or valves *x x*.

A hot-water pipe 35 leads from boiler 36 to pump 37, and thence a circulating-pipe 38 leads into the main and returns through the main to the boiler. By driving hot water through this circuit the temperature of the air in the main 1 may be increased.

It will be understood that a great variety of instrumentalities may be used without departing from the spirit of my invention. Thus any known form of air-heater may be employed to heat the air before passing to the supply-pipes, and any suitable known form of refrigerating apparatus may be used for cooling when desired. The air may be driven by pumps, fans, or other air-forcers, and relays may be provided. The re-enforce air-pipe 24 may bear almost any relation to the main 1, so that it has openings into the main, and various indicating devices common in the art may be used to show the condition and pressure of air in the pipes at various places.

In Fig. 1 the small pipes are shown arranged one above another in pipe 1. In use they will generally be in a horizontal plane. A convenient support for such pipes is shown in Fig. 4. A curved plate or bar 40, which fits the inside of pipe 1, has notches 41 at each end. These notches serve as bearings for roller 42. A similar roller may be supported on brackets 44. The whole device may be termed a "cradle," and is placed inside pipe 1 and secured by short screws 45 wherever necessary. The pipes 24 and 38 rest on roller 42, and the expansion or contraction causes the pipe to move easily on the rollers. At corners, as shown at 46, crimped or corrugated sections of pipe may be provided, and changes of position of the main sections will simply compress or expand the crimps or corrugated portion.

I claim—

1. The combination, with an air-forcer and an air-main leading to houses, of a separate air-forcer and a re-enforce air-pipe communicating with the main at a point remote from the forcer, substantially as described.

2. The combination, with an air-main having pipes leading to houses along the line, of a hot-water-circulating pipe within the main, a re-enforce air-pipe and a forcer therefor, and a valve, whereby the air may be admitted from the re-enforce pipe to the main, substantially as described.

3. In a heating, cooling, and ventilating apparatus substantially such as described, the combination of an air-heater, an air-cooler, an air dampener or sprayer, an air-forcer, and a main connected to all the aforesaid mechanism, whereby the air may be conveyed to houses along the line, substantially as described.

4. In a heating and cooling apparatus, substantially as described, having pipes leading from the main to houses along the line, indicating-instruments arranged along the main to show the condition of the air therein.

5. In a heating, cooling, and ventilating apparatus substantially such as described, the combination of an air-main and a forcer therefor, a re-enforce air-pipe leading thereto and a forcer therefor, and an air-storage reservoir connected to the re-enforce pipe, substantially as described.

6. The combination, with the main, of an internal saddle provided with a roller having end bearings in said saddle and interior pipes resting on said roller, substantially as described.

In testimony whereof I affix my signature in presence of two witnesses.

THEODORE R. TIMBY.

Witnesses:
W. A. BARTLETT,
L. M. BARTLETT.